(12) United States Patent
Matsuzawa

(10) Patent No.: US 7,083,207 B2
(45) Date of Patent: Aug. 1, 2006

(54) BUMPER ATTACHMENT CLIP

(75) Inventor: Kazunari Matsuzawa, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 11/208,626

(22) Filed: Aug. 23, 2005

(65) Prior Publication Data
US 2006/0043745 A1    Mar. 2, 2006

(30) Foreign Application Priority Data
Aug. 30, 2004  (JP) .............. 2004-250212

(51) Int. Cl.
B60R 19/24 (2006.01)
(52) U.S. Cl. ...................... 293/155
(58) Field of Classification Search .......... 293/155, 293/102, 132, 135, 136
See application file for complete search history.

(56) References Cited

U.S. PATENT DOCUMENTS 6,942,262 B1 * 9/2005 Glasgow et al. ............ 293/132
2003/0141729 A1 * 7/2003 Burkhardt et al. .......... 293/133
2003/0222477 A1 * 12/2003 Yoshida et al. ......... 296/187.03

FOREIGN PATENT DOCUMENTS

| DE | 3005859 | * | 8/1981 | |
| DE | 4401865 | * | 8/1994 | ............. 293/133 |
| JP | 06211091 | * | 8/1994 | ............. 293/133 |
| JP | 2000074021 | * | 3/2000 | |
| JP | 2002-362264 | | 12/2002 | |
| JP | 2003-191807 | | 7/2003 | |
| JP | 2005170077 | * | 6/2005 | |

* cited by examiner

Primary Examiner—Hilary Gutman
(74) Attorney, Agent, or Firm—Manabu Kanesaka

(57) ABSTRACT

A bumper attachment clip for attaching and fixing a bumper to a vehicle body includes first and second sections, and an elastic part situated between the first and second sections to be elastically deformable between the first and second sections. At least two attachment parts are formed on the first and second sections for attaching the bumper to the vehicle body.

8 Claims, 5 Drawing Sheets

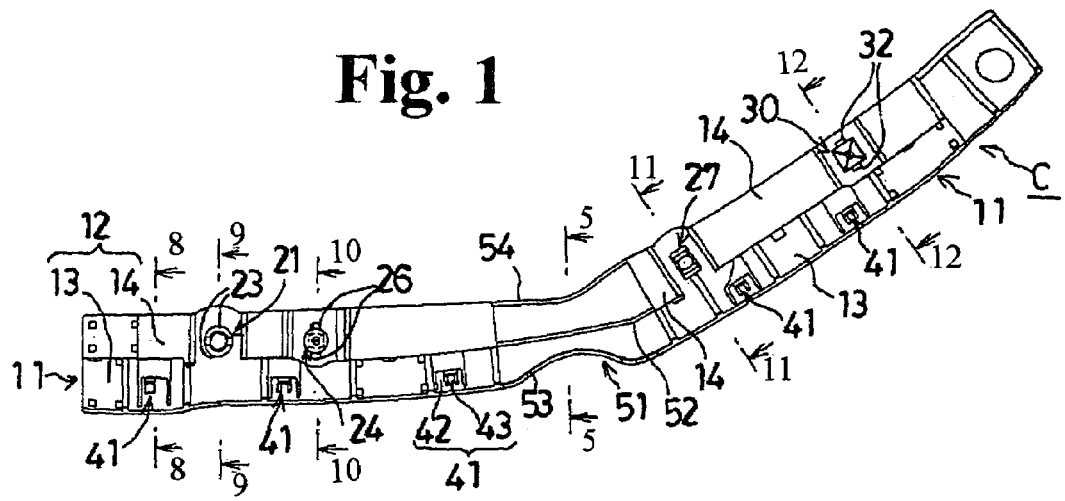
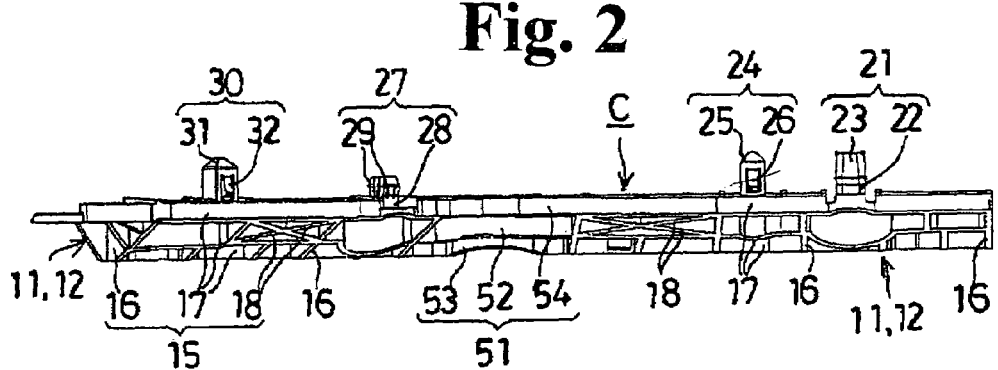
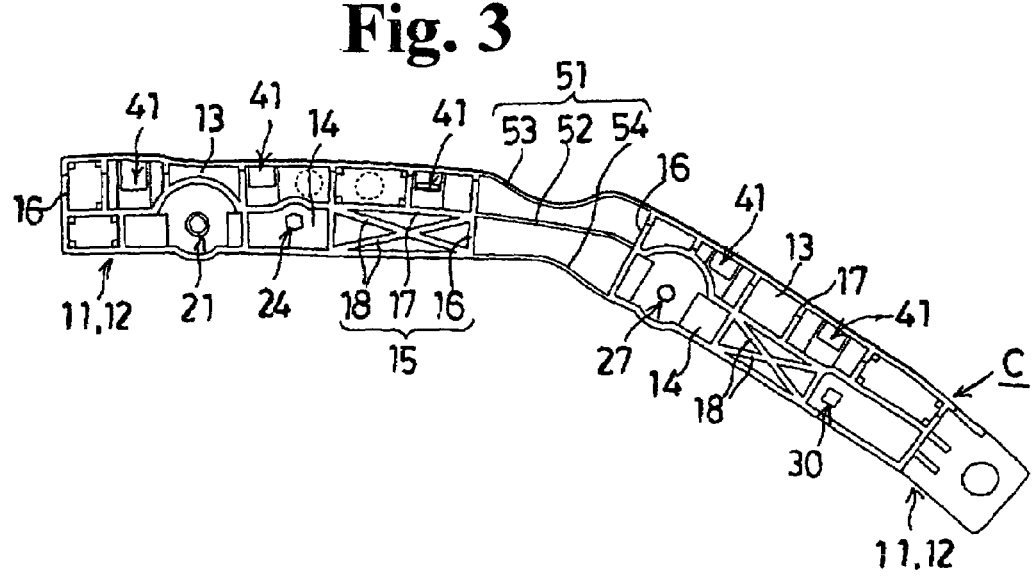

BUMPER ATTACHMENT CLIP

BACKGROUND OF THE INVENTION AND RELATED ART STATEMENT

This invention relates to a bumper attachment clip for attaching and fixing a bumper to a vehicle body.

Conventional bumper attachment clips such those disclosed in the publication of Japanese Unexamined Patent Publication No. 2002-12102, and the publication of Japanese Unexamined Patent Publication No. 2003-191807, are rendered bulky due to the bulkiness of the bumper per se and also as a result of considerations such as a reduction in the number of attachment steps.

When the bumper attachment clip is rendered bulky, as noted above, the dimensional error between the spacing of the attachment receiving part provided on the vehicle body and the spacing of the attachment part provided on the bumper attachment clip also tends to become larger. Accordingly, the attachment of the bumper attachment clip to the vehicle body is rendered more difficult, and there is a possibility that the bumper attachment clip can no longer be attached to the vehicle body.

An object of this invention is to overcome this drawback and to provide a bumper attachment clip which can compensate for dimensional variations and obviate the above mentioned shortcomings.

Further objects and advantages of the invention are apparent from the following description of the invention.

SUMMARY OF THE INVENTION

In accordance with an aspect of this invention, a bumper attachment clip for attaching and fixing a bumper to a vehicle body, has at least two attachment parts for attaching to the vehicle body, and an elastically deformable elastic part which is provided between these at least two attachment parts.

One embodiment of the invention is such that the bumper attachment clip is constructed so that the attachment parts comprise legs which are inserted into attachment holes provided on the vehicle body.

Another embodiment of the invention is such that bumper attachment clip is arranged so that the attachment parts are fixed by screws in attachment holes provided in the vehicle body.

A further embodiment of the invention is such that the bumper attachment clip has stud bolts provided on the vehicle body which are fitted into the attachment parts.

In the above embodiments, the elastic part comprises an elastically deformable plate-shaped body.

In the above embodiments, the elastic part comprises a straight plate-shaped body, and a curved plate-shaped body which is convexly curved with respect to the straight plate-shaped body.

In accordance with the embodiments of this invention, because an elastic part is provided between the attachment parts, the dimensional error between the spacing of the attachment receiving parts provided on the vehicle body and the attachment parts provided on the bumper attachment clip can be absorbed by the elastic deformation of this elastic part. Accordingly, the bumper can be attached to the vehicle body with the bumper attachment clip even if there is a dimensional error or errors between the attachment receiving parts provided on the vehicle body and the attachment parts provided on the bumper attachment clip.

Also, because the attachment parts take the form of legs which are inserted into attachment holes provided on the vehicle body, or the attachment parts are fixable by screws in attachment holes provided on the vehicle body, or because it is constituted such that stud bolts provided on the vehicle body are fitted into the attachment parts, the constitution of the attachment parts can be simplified.

Furthermore, in the embodiment wherein the elastic part is constituted by an elastically deformable plate-shaped body, and/or the elastic part is constituted by a straight plate-shaped body and a curved plate-shaped body which is curved so as to approach and then go away from this straight plate-shaped body (viz., is convexly curved with respect to the straight plate-shape body), the dimensional error between the spacing of the attachment receiving parts provided on the vehicle body and the attachment parts provided on the bumper attachment clip can be absorbed assuredly by an elastic part having a simple constitution.

BRIEF DESCRIPTION OF THE DRAWINGS

FIG. 1 is a plan view of a bumper attachment clip according to one working example of this invention.

FIG. 2 is a back view of the bumper attachment clip shown in FIG. 1.

FIG. 3 is a bottom view of the bumper attachment clip shown in FIG. 1.

DETAILED DESCRIPTION OF THE PREFERRED EMBODIMENTS

Below, exemplary embodiments of this invention are explained based on the drawings.

Figure 4:
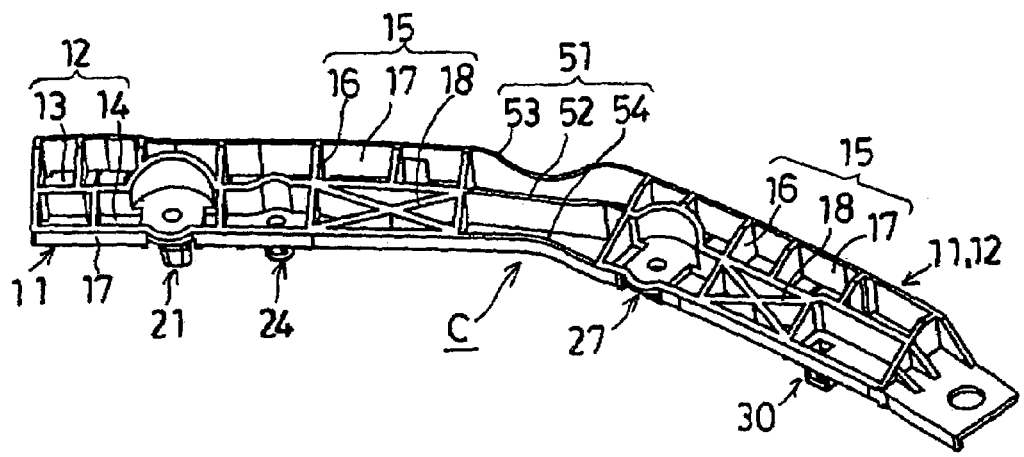
FIG. 4 is a perspective view from the bottom of the bumper attachment clip shown in FIG. 1.
Figure 5:
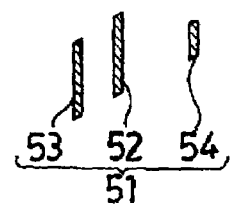
FIG. 5 is a sectional view taken along section line 5—5 of FIG. 1.

FIG. 1 is a plan view of a bumper attachment clip which comprises one embodiment of this invention; FIG. 2 is a back view of the bumper attachment clip shown in FIG. 1; FIG. 3 is a bottom view of the bumper attachment clip shown in FIG. 1; FIG. 4 is a perspective view from the bottom view of the bumper attachment clip shown in FIG. 1; and FIG. 5 is a sectional view along line 5—5 in FIG. 1.

In these drawings, C indicates a bumper attachment clip which is made of a synthetic resin. This clip generally denoted by the letter C, comprises two base plate parts 11, a screw grommet 21 and an anchor clip 24 as attachment parts or leg parts which are provided on one base plate part 11.

The clip further includes a screw grommet 27 and an anchor clip 30 as attachment parts or leg parts are provided on the other base plate part 11, locking parts 41 which are provided respectively on the two base plate parts 11, and an elastic or flexible part 51 for connecting the two base plate parts 11.

The above-mentioned base plate part 11 is constituted by flat plate parts 12, and reinforcing ribs 15 which are provided on the underside (bottom) of the flat plate parts 12.

The flat plate parts 12 are constituted by a first flat plate part 13 which extends in the horizontal direction, and a second flat plate part 14 which extends from the first flat plate part 13 in a position behind this first flat plate part 13. The top side of the second flat plate part is higher than the top side of the first plate part 13 by a prescribed amount.

Figure 7:
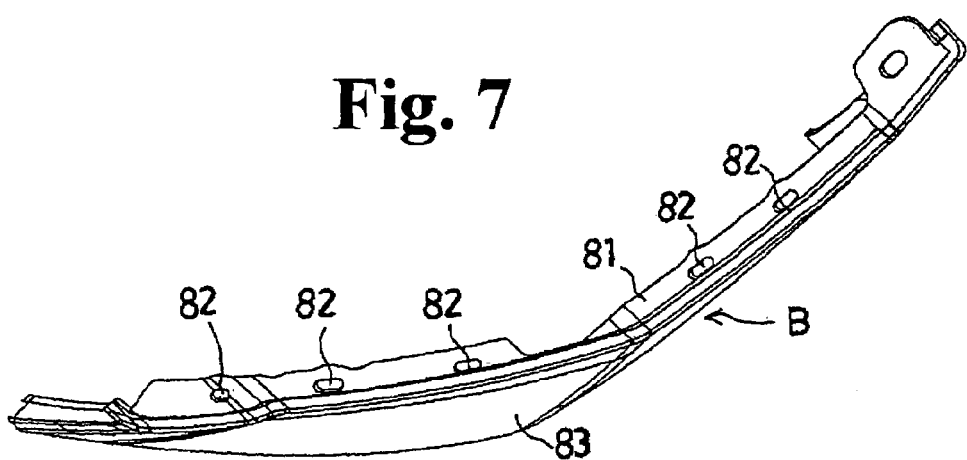
FIG. 7 is a plan view showing a part of the bumper which is attached to the body panel shown in FIG. 6 with the bumper attachment clip shown in FIGS. 1–5.

The side facing the first flat plate part 13 (front side) of the second flat plate part 14 becomes the bumping surface of the bumper B shown in FIG. 7.

Also, the reinforcing ribs 15 comprise vertical ribs 16 and horizontal ribs 17 which surround the perimeter of the flat plate parts 12 and extend in the longitudinal or lateral directions, and cross ribs 18 which go across to opposite corners of the part demarcated by these vertical ribs 16 and horizontal ribs 17.

The above-mentioned screw grommet 21 is constituted by a hollow round pipe 22 which is placed to project upward on a part of the first flat plate part 13 where the second flat plate part 14 is cut away, and a spread-locking piece 23 which is placed opposite the upper end of this hollow round pipe 22. In the space between the lower-side part of an inclined surface (surface which is inclined toward the direction of the center from the outside), which is contracted downward from a bulging part provided on the outer perimeter of the lower end part, and the top side of the second flat plate part 14, the body panel P shown in FIG. 6 to be described later is placed.

The anchor clip 24 is constituted by a hollow conical pipe 25 having the upper end as a cone which is placed projecting upward on the second flat plate part 14, and an elastic locking claw 26 which is placed opposite this hollow conical pipe 25. In the space between the lower end, which can be moved while the upper end is connected as a base end, and the top side of the second flat plate part 14, the body panel P is placed.

The screw grommet 27 is constituted by a hollow square pipe 28 which is placed projecting upward on a part of the first flat plate part 13 where the second flat plate part 14 is cut away, and a spread-locking piece 29 which is placed opposite the upper end of this hollow square pipe 28. In the space between the lower-side part of an inclined surface, which is contracted downward from a bulging part provided on the outer perimeter of the lower end part, and the top side of the second flat plate part 14, the body panel P is placed.

Furthermore, the anchor clip 30 is, as best seen in FIG. 2, constituted by a hollow square pyramidal pipe 31 having the upper end in the form of a square pyramid which is arranged projecting upward on the second flat plate part 14, and an elastic locking claw 32 which is provided on a surface opposite this hollow square pyramidal pipe 31. In the space between the lower end, which can be moved while the upper end is connected as a base end, and the top side of the second flat plate part 14, the body panel P is placed in the manner depicted in FIG. 12.

The above-mentioned locking part 41 is constituted by an elastic piece 42 having the front side of the first flat plate part 13 as a base end and the rear side of the first flat plate part 13 (the side of the second flat plate part 14) as a rotating end, and a locking claw 43 on the top side on the rotating end side of this elastic piece 42 with an inclined surface rising from the front side to the rear side and the rear end as a surface (flat surface, vertical surface) opposing the second flat plate part 14, and it is provided on the first flat plate part 13.

The above-mentioned elastic part 51 is constituted by an elastically deformable straight plate-shaped body 52, and elastically deformable curved plate-shaped bodies 53, 54 which are curved so as to approach and then go away from this straight plate-shaped body 52, being positioned between the screw grommet 21 and the screw grommet 27, and between the anchor clip 24 and the anchor clip 30, that is, being positioned between the base plate parts 11, so as to connect the base plate parts 11 together.

The two curved plate-shaped bodies 53, 54 are disposed so as to sandwich the straight plate-shaped body 52.

Figure 6:
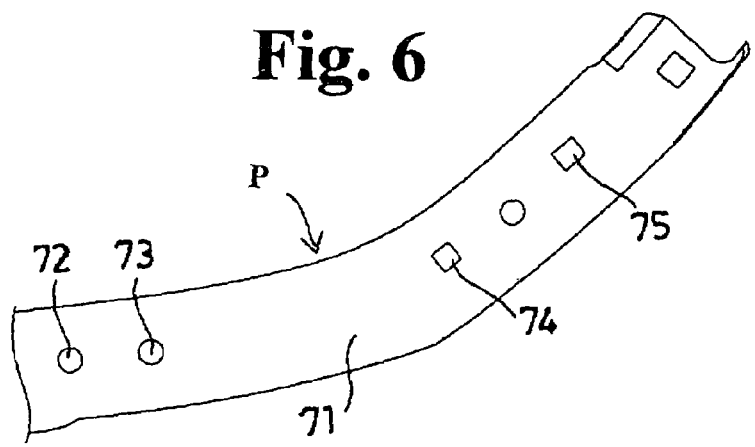
FIG. 6 is a plan view showing a part of a vehicle body to which a bumper is attached with the bumper attachment clip shown in FIGS. 1–5.

FIG. 6 is a plan view showing a part of a vehicle body to which a bumper is attached with the bumper attachment clip shown in FIGS. 1–5.

In FIG. 6, the letter P indicates a body panel as the vehicle body, and for example, it has a horizontal step part 71 to which the bumper attachment clip C shown in FIG. 1–FIG. 5 and the bumper B shown in FIG. 7 to be described later, are attached.

Also, on the horizontal step part 71, there are provided an attachment hole 72 having a shape corresponding to the screw grommet 21 in a position corresponding to the screw grommet 21, an attachment hole 73 having a shape corresponding to the anchor clip 24 in a position corresponding to the anchor clip 24, an attachment hole 74 having a shape corresponding to the screw grommet 27 in a position corresponding to the screw grommet 27, and an attachment hole 75 having a shape corresponding to the anchor clip 30 in a position corresponding to the anchor clip 30, of the bumper attachment clip C.

FIG. 7 is a plan view showing a part of the bumper which is attached to the body panel shown in FIG. 6 with the bumper attachment clip shown in FIGS. 1–5.

In FIG. 7, the letter B indicates the bumper which is provided with an attachment flange part 81 which is held between the bumper attachment clip C shown in FIGS. 1–5 and the body panel P shown in FIG. 6, and a face part 83 which extends downward with respect to the front side of this attachment flange part 81.

Also, on the attachment flange part 81, attachment holes 82 are provided in positions corresponding to each locking claw 43 constituting the locking part 41 of the bumper attachment clip C.

Figure 8:
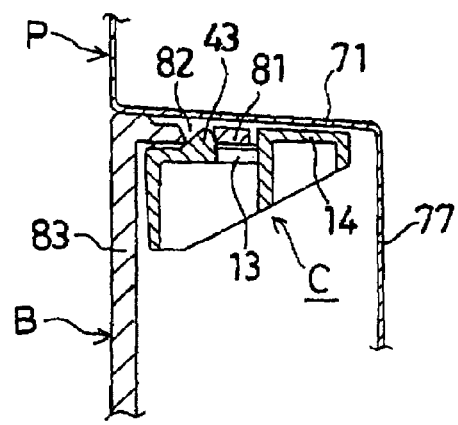
FIG. 8 is an enlarged sectional view taken along section line 8—8 of FIG. 1, showing the state in which the bumper shown in FIG. 7 is attached to the body panel shown in FIG. 6 with the bumper attachment clip shown in FIGS. 1–5.
Figure 9:
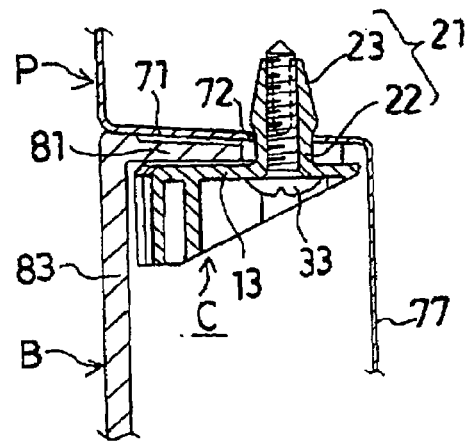
FIG. 9 is an enlarged sectional view taken along section line 9—9 of FIG. 1, showing the state in which the bumper shown in FIG. 7 is attached to the body panel shown in FIG. 6 with the bumper attachment clip shown in FIGS. 1–5.
Figure 10:
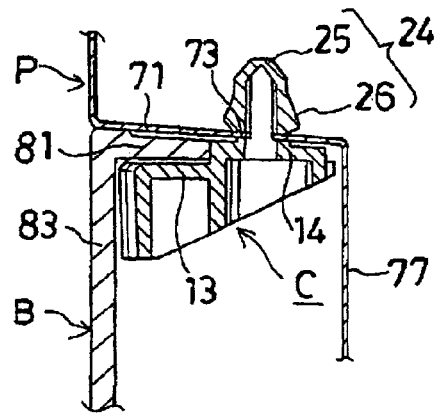
FIG. 10 is an enlarged sectional view taken along section line 10—10 of FIG. 1, showing the state in which the bumper shown in FIG. 7 is attached to the body panel shown in FIG. 6 with the bumper attachment clip shown in FIGS. 1–5.
Figure 11:
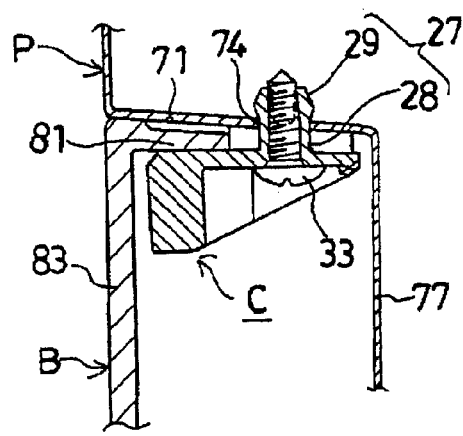
FIG. 11 is an enlarged sectional view taken along section line 11—11 of FIG. 1, showing the state in which the bumper shown in FIG. 7 is attached to the body panel shown in FIG. 6 with the bumper attachment clip shown in FIGS. 1–5.
Figure 12:
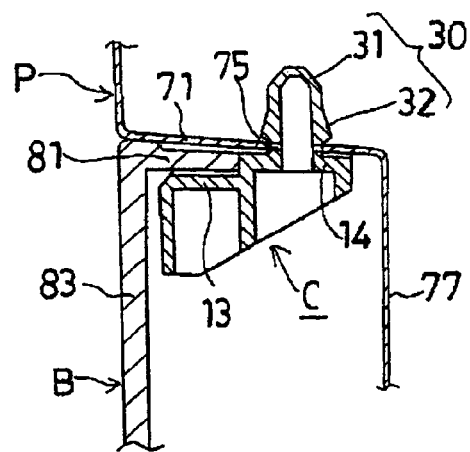
FIG. 12 is an enlarged sectional view taken along section line 12—12 of FIG. 1, showing the state in which the bumper shown in FIG. 7 is attached to the body panel shown in FIG. 6 with the bumper attachment clip shown in FIG. 1–FIG. 5.

FIG. 8 is an enlarged sectional view taken along section line 8—8 of FIG. 1, showing the state in which the bumper shown in FIG. 7 is attached to the body panel shown in FIG. 6 with the bumper attachment clip shown in FIGS. 1–5; FIG. 9 is an enlarged sectional view taken along section line 9—9 of FIG. 1, showing the state in which the bumper shown in FIG. 7 is attached to the body panel shown in FIG. 6 with the bumper attachment clip shown in FIGS. 1–5; FIG. 10 is an enlarged sectional view taken along section line 10—10 of FIG. 1, showing the state in which the bumper shown in FIG. 7 is attached to the body panel shown in FIG. 6 with the bumper attachment clip shown in FIGS. 1–5; FIG. 11 is an enlarged sectional view taken along section line 11—11 of FIG. 1, showing the state in which the bumper shown in FIG. 7 is attached to the body panel shown in FIG. 6 with the bumper attachment clip shown in FIGS. 1–5; and FIG. 12 is an enlarged sectional view taken along section line 12—12 of FIG. 1, showing the state in which the bumper shown in FIG. 7 is attached to the body panel shown in FIG. 6 with the bumper attachment clip shown in FIGS. 1–5.

In FIGS. 8–12, numeral 77 denotes a suspended part, which is a continuation of the horizontal step part 71 on the side facing the vehicle body.

In FIGS. 9 and 11, the numeral 33 denotes a fitting screw. By screwing this screw into the hollow round pipe 22 inserted through the attachment hole 72 of the horizontal step part 71 or the hollow square pipe 28 inserted through the attachment hole 74 of the horizontal step part 71, the portion of the screw which extends through the hollow round pipe 22 or the hollow square pipe 28, spreads to open the spread-locking piece 23, 29, whereby fastening the bumper attachment clip C to the horizontal step part 71.

Next, an example of attaching the bumper B to the body panel P is explained.

First, the bumper attachment clip C is positioned beneath the horizontal step part 71 of the body panel P with the screw grommets 21, 27 and the anchor clips 24, 30 turned upward in a manner so as to correspond to the attachment holes 72–75 of this horizontal step part 71.

Also, by pushing the bumper attachment clip C up toward the side of the horizontal step part 71, the screw grommet 21 is pressed into engagement with the attachment hole 72, the anchor clip 24 is pressed into the attachment hole 73, the screw grommet 27 is pressed into engagement with the attachment hole 74, and the anchor clip 30 is pressed into the attachment hole 75.

When the screw grommets 21, 27 are pressed into engagement with the attachment holes 72, 74 in this manner, the spread-locking pieces 23, 29 are contracted by the bulging parts being pressed by the edges of the attachment holes 72, 74, whereby the spread-locking pieces 23, 29 can pass through the attachment holes 72, 74.

When the most bulging parts of the bulging parts of the spread-locking pieces 23, 29 pass through the attachment holes 72, 74, the spread-locking pieces 23, 29 spread out to their original state due to their inherent elasticity, whereby the lower-side parts of the bulging parts of the spread-locking pieces 23, 29 couple with the edges of the attachment holes 72, 74.

When the anchor clips 24, 30 are pressed into the attachment holes 73, 75, the elastic locking claws 26, 32 are contracted by being pressed by the edges of the attachment holes 73, 75, whereby the elastic locking claws 26, 32 can pass through the attachment holes 73, 75.

When the lower ends of the elastic locking claws 26, 32 pass through the attachment holes 73, 75, the elastic locking claws 26, 32 spread out to the original state by their inherent elasticity, whereby the lower ends of the elastic locking claws 26, 32 couple with the edges of the attachment holes 73, 75.

Accordingly, the bumper attachment clip C can be securely attached to the horizontal step part 71 of the body panel P, as shown in FIG. 10 and FIG. 12.

When the bumper attachment clip C is attached to the horizontal step part 71 of the body panel P in this manner, even if there are dimensional errors between the attachment hole 72 and the attachment hole 74, and between the attachment hole 73 and the attachment hole 75, the dimensional errors between the attachment hole 72 and the attachment hole 74, and between the attachment hole 73 and the attachment hole 75, these errors can be absorbed by three-dimensional deformation of the elastic part 51 provided between the base plate parts 11.

Accordingly, the bumper attachment clip C can be attached to the horizontal step part 71 even if there are dimensional errors between the attachment hole 72 and the attachment hole 74, and between the attachment hole 73 and the attachment hole 75, of the horizontal step part 71.

Next, as shown in FIG. 9 and FIG. 11, by screwing the fitting screws 33 into the hollow round pipe 22 and the hollow square pipe 28, the screw parts run through the hollow round pipe 22 and the hollow square pipe 28 to open the spread-locking pieces 23, 29, whereby the bumper attachment clip C can be fastened to the horizontal step part 71.

Thus, when the bumper attachment clip C is attached to the horizontal step part 71, a gap (space) in which the attachment flange 81 of the bumper B can be inserted is assured between the horizontal step part 71 and the first flat plate part 13 by the second flat plate part 14.

In this state, when the respective attachment holes 82 of the attachment flange 81 are made to correspond with the attachment parts 41 of the bumper attachment clip C and the attachment flange 81 is pushed in between the horizontal step part 71 and the first flat plate part 13, the elastic pieces 42 bend by the attachment flange 81 pushing the respective locking claws 43, whereby the attachment flange 81 can be pushed in up to where it engages with the second flat plate part 14.

Also, when the attachment flange 81 is pushed to a portion where it engages the second flat plate part 14, by entry of the respective locking claws 43 into the attachment holes 82, the elastic pieces 42 return to the original state due to their inherent elasticity, whereby the respective locking claws 43 couple with the edges of the attachment holes 82 as shown in FIG. 8.

Accordingly, the bumper B can be attached to the body panel P using the bumper attachment clip C as shown in FIGS. 8–12.

In accordance with the embodiment of this invention as described above, because elastic parts 51 are provided between the screw grommets 21, 27 and the anchor clips 24, 30, dimensional errors between the attachment hole 72 and the attachment hole 74, and between the attachment hole 73 and the attachment hole 75, can be compensated for through this elastic part 51 being elastically deformed.

Accordingly, the bumper B can be attached to the horizontal step part 71 with the bumper attachment clip C even if there are dimensional errors between the attachment hole 72 and the attachment hole 74, and between the attachment hole 73 and the attachment hole 75, of the horizontal step part 71.

Further, because the attachment parts take the form of screw grommets 21, 27 and anchor clips 24, 30, the constitution of the attachment parts can be rendered simple.

Furthermore, because the elastic part 51 was constituted by an elastically deformable straight plate-shaped part 52 and elastically deformable convexly curved plate-shaped parts 53, 54 which are curved so as to approach and then go away from this straight plate-shaped part 52, the dimensional errors between the attachment hole 72 and the attachment hole 74, and between the attachment hole 73 and the attachment hole 75, of the horizontal step part 71 can be absorbed assuredly by an elastic part 51 having a simple constitution.

Figure 13:
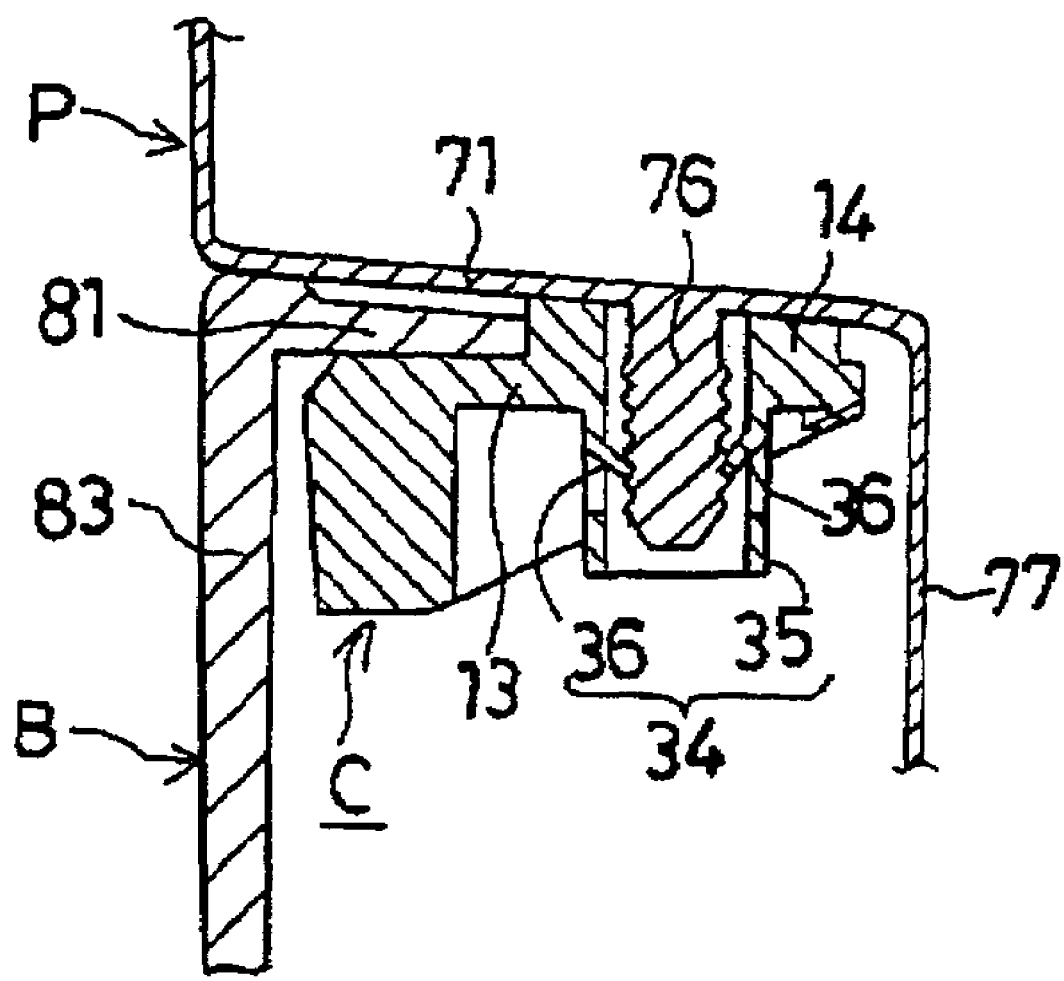
FIG. 13 is sectional view of a bumper attachment clip according to a further embodiment of the invention.

FIG. 13 is an explanatory drawing of a bumper attachment clip according to another embodiment of this invention. In this figure the same symbols are assigned to the same or similar parts as in FIGS. 1–12, and an explanation thereof is omitted for the sake of brevity.

The points in which this embodiment differs from the previous embodiments are the parts of the attachment parts and the parts of the attachment receiving parts of the body panel corresponding to these attachment parts.

In FIG. 13, numeral 34 denotes an attachment part which is provided projecting downward from the second flat plate part 14, and it is constituted by a hollow round pipe 35 which is arranged to extend through the second flat plate part 14, and an elastic locking claw 36 which contracts downward from above, and which is provided on the part projecting downward from the second flat plate part 14 of this hollow round tube 35.

The numeral 76 denotes a stud bolt which is provided in a prescribed position on the underside of the horizontal step part 71. Plural attachment parts 35 and stud bolts 76 are provided correspondingly.

Next, attachment of the bumper B to the body panel P is explained.

First, the bumper attachment clip C is positioned beneath the horizontal step part 71 of the body panel P with the second flat plate part 14 turned upward making the attachment parts 34 correspond with the stud bolts 76.

Also, by pushing the bumper attachment clip C up toward the side of the horizontal step part 71, the stud bolts 76 are pressed into the hollow round pipes 35.

When the stud bolts 76 are pressed into the hollow round pipes 35 in this manner, the stud bolts 76 cause the corresponding elastic locking claws 36 to spread, whereby the bumper attachment clip C can be pushed up toward the side of the horizontal step part 71 up to where the second flat plate part 14 contacts with the underside of the body panel P.

Also, when the second flat plate part 14 contacts with the underside of the body panel P, because the front ends (lower ends) of the opposing elastic locking claws 36 contract by their inherent elasticity and couple with the screw threads of the stud bolts 76, the bumper attachment clip C can be securely attached to the horizontal step part 71 of the body panel P so as not to fall off.

Thus, when the bumper attachment clip C is attached to the horizontal step part 71, a gap (space) in which the attachment flange 81 of the bumper B can be inserted is assured between the horizontal step part 71 and the first flat plate part 13 by the second flat plate part 14. Accordingly, the bumper B can be attached as previously described.

Even if the attachment parts 34 are constituted so as to be fitted with stud bolts 76 provided on the body panel P as in this embodiment, the constitution of the attachment parts 34 can be made simple.

In the above-mentioned exemplary embodiments, examples were shown in which the elastic part 51 was provided between the base plate parts 11, but elastic parts also may be provided so as to be positioned between the attachment parts.

When elastic parts are provided so as to be positioned between the attachment parts in this manner, the dimensional errors can be further absorbed.

Also, examples were shown in which the elastic part 51 was constituted by a straight plate-shaped body 52 and two curved plate-shaped bodies 53, 54, but the elastic part also may be constituted with only a straight plate-shaped body, also, it may be constituted by one curved plate-shaped body positioned on a straight plate-shaped body 52, or constituted by two curved plate-shaped bodies, or constituted by a straight plate-shaped body and one of the curved plate-shaped bodies.

Furthermore, examples were shown in which the bumper B is attached to the horizontal step part 71 of the body panel P with the bumper attachment clip C, but it is also possible to attach the bumper to the suspended part 77 of the body panel P with the bumper attachment clip.

As will be appreciated, even though the present invention has been described with reference to only a limited number of embodiments, the various modifications and variations which can be made without departing from the scope of the present invention, which is limited only the appended claims, will be self-evident to those skilled in the art to which the present invention pertains or most closely pertains, given the preceding disclosure.

The disclosure of Japanese Patent Application No. 2004-250212 filed on Aug. 30, 2004 is incorporated in the application.

What is claimed is:

1. A bumper attachment clip for attaching and fixing a bumper to a vehicle body, comprising:
   first and second sections, and an elastic part situated between the first and second sections to be elastically deformable between the first and second sections, and
   at least two attachment parts formed on the first and second sections for attaching the bumper to the vehicle body,
   wherein the attachment parts are legs which are inserted into attachment holes provided on the vehicle body.

2. A bumper attachment clip according to claim 1, wherein the attachment parts are fixed by screws in attachment holes provided on the vehicle body.

3. A bumper attachment clip for attaching and fixing a bumper to a vehicle body, comprising:
   first and second sections, and an elastic part situated between the first and second sections to be elastically deformable between the first and second sections, and
   at least two attachment parts formed on the first and second sections for attaching the bumper to the vehicle body,
   wherein said attachment parts receive stud bolts provided on the vehicle body.

4. A bumper attachment clip according to claim 1, wherein the elastic part is constituted by an elastically deformable plate-shaped body.

5. A bumper attachment clip according to claim 4, wherein the elastic part is constituted by a straight plate-shaped body, and a curved plate-shaped body which is curved so as to approach and then go away from this straight plate-shaped body.

6. A bumper attachment clip for attaching and fixing a bumper to a vehicle body, comprising:
   first and second sections, and an elastic part situated between the first and second sections to be elastically deformable between the first and second sections, and at least two attachment parts formed on the first and second sections for attaching the bumper to the vehicle body, wherein said elastically deformable section is arranged to allow the first and second sections to move relative to one another to compensate for dimensional variations in at least one of the bumper, the vehicle body and the bumper attachment clip.

7. A bumper attachment clip according to claim 6, wherein each attachment part has a hollow portion and locking claws extending laterally from the hollow portion to snap fit into openings formed in the vehicle body.

8. A bumper attachment clip according to claim 7, wherein each of the first and second sections includes a screw grommet having a hole to receive a screw therein, and an anchor clip engaging a hole of the vehicle body.

* * * * *